(12) United States Patent
Tang

(10) Patent No.: US 11,553,067 B2
(45) Date of Patent: *Jan. 10, 2023

(54) METHOD AND DEVICE FOR TRANSMITTING DATA

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 98 days.

This patent is subject to a terminal disclaimer.

(21) Appl. No.: 17/338,120

(22) Filed: Jun. 3, 2021

(65) Prior Publication Data

US 2021/0297512 A1  Sep. 23, 2021

Related U.S. Application Data

(63) Continuation of application No. 16/713,948, filed on Dec. 13, 2019, now Pat. No. 11,050,862, which is a (Continued)

(30) Foreign Application Priority Data

Jun. 15, 2017 (CN) .................. PCT/CN2017/088515

(51) Int. Cl.
*H04L 69/324* (2022.01)
*H04L 49/9057* (2022.01)

(52) U.S. Cl.
CPC ........ *H04L 69/324* (2013.01); *H04L 49/9057* (2013.01)

(58) Field of Classification Search
USPC ....... 370/241, 252, 389, 394, 412, 428, 429, 370/468, 469, 474
See application file for complete search history.

(56) References Cited

U.S. PATENT DOCUMENTS

| 6,556,586 B1 | 4/2003 | Sipila |
| 7,426,671 B2 * | 9/2008 | Kimura ................. H04L 1/1841 714/751 |

(Continued)

FOREIGN PATENT DOCUMENTS

| CN | 101141405 A | 3/2008 |
| CN | 101729396 A | 6/2010 |

(Continued)

OTHER PUBLICATIONS

The first Office Action of corresponding Indonesian application No. P00202000289, dated Jul. 29, 2022.

(Continued)

Primary Examiner — Nguyen H Ngo
(74) Attorney, Agent, or Firm — Ladas & Parry LLP

(57) ABSTRACT

Embodiments of the present application provide a method and a device for transmitting data, which are capable of achieving timely data transmission. The method includes: starting, by a receiving end, a timer of a first delivery mode when determining that data delivered and data to be delivered are not continuous, where the first delivery mode is used to indicate that the receiving end directly delivers data to an upper layer upon the receipt of the data; and delivering, the receiving end, the data to be delivered to the high level using the first delivery mode in a case where the timer of the first delivery mode does not expire.

16 Claims, 4 Drawing Sheets

A receiving end starts a timer of a first delivery mode when determining that data delivered and data to be delivered are not continuous, where the first delivery mode is used to indicate that the receiving end directly delivers data to an upper layer upon the receipt of the data — S210

The receiving end delivers the data to be delivered to the upper layer using the first delivery mode when the timer of the first delivery mode does not expire — S220

Related U.S. Application Data continuation of application No. PCT/CN2018/077052, filed on Feb. 23, 2018.

(56) References Cited

U.S. PATENT DOCUMENTS

| | | | |
|---|---|---|---|
| 2007/0070937 A1 | 3/2007 | Demirhan | |
| 2008/0209297 A1 | 8/2008 | Chandra et al. | |
| 2009/0034476 A1 | 2/2009 | Wang et al. | |
| 2009/0190554 A1* | 7/2009 | Cho | H04W 76/27 370/331 |
| 2011/0149905 A1 | 6/2011 | Kim | |
| 2012/0294281 A1 | 11/2012 | Park | |
| 2016/0043955 A1 | 2/2016 | Koskinen | |
| 2016/0044639 A1* | 2/2016 | Yl | H04W 72/042 370/329 |
| 2016/0234847 A1* | 8/2016 | Zhang | H04W 48/06 |
| 2017/0111945 A1 | 4/2017 | Yi et al. | |

FOREIGN PATENT DOCUMENTS

| | | | |
|---|---|---|---|
| CN | 101883354 A | 11/2010 | |
| CN | 102655448 A | 9/2012 | |
| CN | 104426638 A | 3/2015 | |
| CN | 104812000 A | 7/2015 | |
| CN | 106031229 A | 10/2016 | |
| EP | 3182658 A1 | 6/2017 | |
| JP | 2019537308 A | 12/2019 | |
| RU | 2461136 C2 | 9/2012 | |
| RU | 2471308 C2 | 12/2012 | |
| RU | 2604424 C2 | 12/2016 | |
| WO | 2015163839 A1 | 10/2015 | |

OTHER PUBLICATIONS

The first Office Action of corresponding Japanese application No. 2019-569446, dated Jan. 25, 2022.
Ericsson, introduction of Ultra Reliable Low Latency Communication for LTE[online], R2-1809261, Jun. 4, 2018.
Ericsson, Handling of split SRBs in LTE PDCP for LTE-NR interworking[online]. 3GPP TSG RAN WG2 #98 R2-1704423, Internet<URL:http://www.3gpp.org/ftp/tsg ran/WG2_RL2/TSGR2_98/Docs/R2-1704423.zip>, May 19, 2017.
The second Office Action of corresponding Canadian application No. 3067481, dated Feb. 2, 2022.
The first Office Action of corresponding Indian application No. 201917051348, dated Jun. 24, 2021.
The first Office Action of corresponding Chilean application No. 201903649, dated Jul. 2, 2021.
International Search Report (ISR) dated May 16, 2018 for Application No. PCT/CN2018/077052.
International Search Report (ISR) dated Mar. 5, 2018 for Application No. PCT/CN2017/088515.
3GPP TS 25.322 V7.3.0; 3rd Generation Partnership Project; Technical Specification Group Radio Access Network; Radio Link Control (RLC) protocol specification(Release 7). 3GPP Technical Specification. Jun. 30, 2007(Jun. 30, 2007), pp. 10-25.
The partial search report of corresponding European application No. 18818444.4, dated Feb. 17, 2020.
CMCC: "Introducing Transmission Mode for PDCP Operation", 3GPP Draft; R2-1705784 Introducing Transmission Mode for PDCP Operation, 3rd Generation Partnership Project (3GPP), Mobile Competence Centre; 650, Route Des Lucioles; F-06921 Sophia-Antipolis Cedex, vol. RAN WG2, No. Hangzhou, China; May 15, 2017-May 19, 2017 May 14, 2017(May 14, 2017), XP051276069.
The first Office Action of corresponding Taiwan application No. 107120592 dated Mar. 24, 2020.
3GPP TSG-RAN WG2 Meeting #98 R2-1704264; NR PDCP window and timer mechanisms, Hangzhou, China, May 15-19, 2017.
The EESR of corresponding European application No. 18818444.4, dated Jun. 9, 2020.
Sequans Communications, 3GPP TSG-RAN WG2 Meeting #98, R2-1705776; Disabling of PDCP reordering, Hangzhou, China, May 16-19, 2017.
Nokia et al."De-activation of re-ordering in PDCP", 3GPP DRAFT; R2-1705446 De-Activation of Reordering in PDCP, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017(May 14, 2017), XP051275840.
The First Office Action of corresponding European application No. 18818444.4, dated Mar. 17, 2021.
The Notice of Allowance of corresponding Russian application No. 2019143071. dated Apr. 22, 2021.
The First Office Action of corresponding Chinese application No. 202010074394.0, dated May 14, 2021.
Intel Corporation (Rapporteur). 3GPP TSG-RAN WG2 Meeting #95bis R2-166883, Report of email discussion: [95#27][LTE/NR] Reordering (Intel), Kaohsiung, Oct. 10-14, 2016.
The Non-final rejection corresponding U.S. Appl. No. 16/713,948, dated Aug. 5, 2020.
The Notice of Allowance corresponding U.S. Appl. No. 16/713,948, dated Feb. 24, 2021.
The third Office Action of corresponding European application No. 18818444.4, dated Sep. 27, 2021.

* cited by examiner

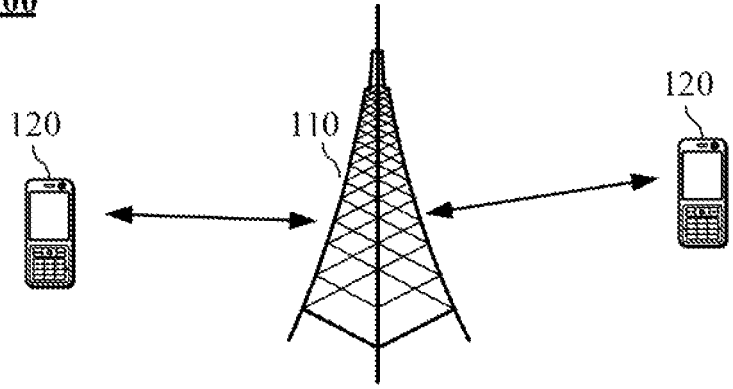

FIG. 1

```
A receiving end starts a timer of a first delivery mode when determining that data     S210
delivered and data to be delivered are not continuous, where the first delivery mode is
used to indicate that the receiving end directly delivers data to an upper layer upon the
                              receipt of the data

|

The receiving end delivers the data to be delivered to the upper layer using the first    S220
     delivery mode when the timer of the first delivery mode does not expire
```

FIG. 2

```
   A receiving end sets a duration of a timer of a second delivery mode to zero when     S310
      determining that data is delivered to an upper layer using a first delivery mode

|

The receiving end deliver data to be delivered to the upper layer using the first delivery   S320
 mode, where the first delivery mode is used to indicate that the receiving end directly
   delivers data to the upper layer upon the receipt of the data, and the second delivery
   mode is used to indicate that the receiving end delivers data to the upper layer in order
```

S710: A terminal device receives indication information sent by a network device, where the indication information is used to indicate that a packet data convergence protocol PDCP layer and a radio link control RLC layer of the terminal device deliver data to a upper layer using a first delivery mode or a second delivery mode, where the first delivery mode is used to indicate that the terminal device directly generates service data unit SDU data and deliver the SDU data to the upper layer upon receipt of protocol data unit PDU data, and the second delivery mode is used to indicate that the terminal device delivers data to the upper layer in order S720: Deliver the SDU data to the upper layer according to the indication information

FIG. 4

METHOD AND DEVICE FOR TRANSMITTING DATA

CROSS-REFERENCE TO RELATED APPLICATION

The present application is a continuation of U.S. patent application Ser. No. 16/713,948, filed on Dec. 13, 2019, which is a continuation of International Application No. PCT/CN2018/077052, filed on Feb. 23, 2018, which claims priority to PCT patent application PCT/CN2017/088515, filed on Jun. 15, 2017 and entitled "Method and Device for Transmitting Data". All contents of these applications are incorporated by reference herein in their entireties.

TECHNICAL FIELD

The present application relates to the field of communications, and, more particularly, to a method and a device for transmitting data.

BACKGROUND

In a Long Term Evolution (LTE) system, a Radio Link Control (RLC) entity delivers data to a Packet Data Convergence Protocol (PDCP) layer in order, that is, a Service Data Unit (SDU) n must be delivered to the PDCP layer before an SDU n+1.

However, in a New Radio (NR) system, in some cases, there is no need to deliver in order. Therefore, a new delivery manner is needed to meet the needs of different scenarios.

SUMMARY

Embodiments of the present application provides a method and a device for transmitting data, which are capable of achieving data delivery to an upper layer in real-time.

In a first aspect, a method for transmitting data is provided, including:

starting, by a receiving end, a timer of a first delivery mode when determining that delivered data and data to be delivered are not continuous, where the first delivery mode is used to indicate that the receiving end directly delivers data to an upper layer upon receipt of the data; and delivering, by the receiving end, the data to be delivered to the upper layer using the first delivery mode when the timer of the first delivery mode does not expire.

Therefore, in the case where the delivered data and the data to be delivered are not continuous, the receiving end may deliver data to the upper layer using the first delivery mode by starting the timer of the first delivery mode. In the first delivery mode, after receiving the data, the receiving end does not need to save discontinuous data in a receiving buffer, but can directly deliver the data to the upper layer, which is capable of achieving timely data delivery, and in the first delivery mode, it does not need to use the receiving buffer, thus saving system resources.

In conjunction with the first aspect, in some implementations of the first aspect, the method further includes:

stopping, by the receiving end, the timer of the first delivery mode when determining that the delivered data and the data to be delivered are continuous, if the timer of the first delivery mode is running.

That is, when the timer of the first delivery mode is in a non-operating state, a start condition of the timer of the first delivery mode may be that the data to be delivered and the delivered data are not continuous; when the first delivery mode timer is in an operating state, the stop condition of the timer of the first delivery mode may be that the data to be delivered and the delivered data are continuous.

In conjunction with the first aspect, in some implementations of the first aspect, the method further includes:

determining, by the receiving end, whether the delivered data and the data to be delivered are continuous according to window information of a reordering window and information of the delivered data.

In conjunction with the first aspect, in some implementations of the first aspect, the window information of the reordering window includes a window lower bound identification of the reordering window, and the determining, by the receiving end, whether the delivered data and the data to be delivered are continuous according to the window information of the reordering window and the information of the delivered data, includes:

determining, by the receiving end, whether the delivered data and the data to be delivered are continuous according to the window lower bound identification of the reordering window and a serial number SN of a last delivered service data unit SDU.

In some embodiments, the window lower bound identification of the reordering window may be a Sequence Number (SN) of a next PDU waiting to be received, or a next SN of a highest SN in the received PDU, if a SN of a data packet is smaller than the window lower bound of the reordering window, that is, the SN of the data packet is outside the reordering window, then the data packet can be considered as having been successfully received and delivered to the upper layer, and the window upper bound identification of the window can be the window lower bound identification+window size.

Therefore, the window lower bound identification of the reordering window can indicate information of the data to be delivered, for example, a minimum SN of the data to be delivered, so that the receiving end judges, according to the minimum SN of the data to be delivered and a maximum SN of the delivered data, whether the two are continuous, so as to determine whether the data to be delivered and the delivered data are continuous.

In conjunction with the first aspect, in some implementations of the first aspect, the determining, by the receiving end, whether the delivered data and the data to be delivered are continuous according to the window lower bound identification of the reordering window and the serial number SN of the last delivered service data unit SDU, includes:

determining that the delivered data and the data to be delivered are not continuous if a count value corresponding to the window lower bound identification is not equal to a count value corresponding to a next SN of the SN of the last delivered SDU; or determining that the delivered data and the data to be delivered are continuous if the count value corresponding to the window lower bound identification is equal to the count value corresponding to the next SN of the SN of the last delivered SDU.

Here, the count value corresponding to the next SN of the SN of the SDU may be the SN of the last delivered data, plus one, and then be determined in conjunction with RX_HFN.

In conjunction with the first aspect, in some implementations of the first aspect, the method further includes:

setting a window lower bound identification of a reordering window to a count value corresponding to an SDU that is expected to be delivered next time when the timer of the first delivery mode is in an expired state.

Here, the count value corresponding to the SDU that is expected to be delivered next time may be the SN that is expected to be delivered next time, and be determined in conjunction with RX_HFN.

In conjunction with the first aspect, in some implementations of the first aspect, the receiving end starts a timer of the first delivery mode when determining that the delivered data and the data to be delivered are not continuous, includes:

starting the timer of the first delivery mode when the count value corresponding to the SDU that is expected to be delivered next time is not equal to the count value corresponding to the last delivered SDU.

In conjunction with the first aspect, in some implementations of the first aspect, the receiving end is a terminal device or a network device.

In conjunction with the first aspect, in some implementations of the first aspect, the receiving end is a terminal device, and the method further includes:

receiving, by the receiving end, indication information sent by a network device, where the indication information is used to indicate that the terminal device delivers data to the upper layer using the first delivery mode or a second delivery mode, where the second delivery mode is used to indicate that the receiving end delivers data to the upper layer in order.

In some embodiments, the indication information is specifically configured to indicate that a packet data convergence protocol PDCP layer of the terminal device delivers data to the upper layer using the first delivery mode or the second delivery mode.

In some embodiments, the indication information is specifically configured to indicate that a radio link control RLC layer of the terminal device delivers data to the upper layer using the first delivery mode or the second delivery mode.

In conjunction with the first aspect, in some implementations of the first aspect, the receiving, by the receiving end, the indication information sent by the network device, includes:

receiving, by the receiving end, a radio resource control RRC signaling sent by the network device, where the radio resource control signaling includes the indication information.

In conjunction with the first aspect, in some implementations of the first aspect, the receiving, by the receiving end, the indication information sent by the network device, including:

receiving, by the receiving end, a media access control MAC control element CE or a packet data convergence protocol PDCP control protocol data unit PDU, sent by the network device, where the MAC CE or PDCP control PDU includes the indication information.

In a second aspect, a method for transmitting data is provided, including:

setting, by a receiving end, a duration of a timer of a second delivery mode to zero when determining that data is delivered to an upper layer using a first delivery mode;

delivering, by the receiving end, data to be delivered to the upper layer using the first delivery mode;

where the first delivery mode is used to indicate that the receiving end directly delivers data to the upper layer upon receipt of the data, and the second delivery mode is used to indicate that the receiving end delivers data to the upper layer in order.

In a third aspect, a device for transmitting data is provided, including:

receiving, by a terminal device, indication information sent by a network device, where the indication information is used to indicate that a packet data convergence protocol PDCP layer and a radio link control RLC layer of the terminal device deliver data to an upper layer using a first delivery mode or a second delivery mode, where the first delivery mode is used to indicate that the terminal device directly generates service data unit SDU data and deliver the SDU data to the upper layer upon receipt of protocol data unit PDU data, and the second delivery mode is used to indicate that the terminal device delivers data to the upper layer in order; and deliver the SDU data to the upper layer according to the indication information.

In a fourth aspect, a device for transmitting data is provided, including a unit for executing the methods according to the first aspect or any optional implementation of the first aspect as such.

In a fifth aspect, a device for transmitting data is provided, including a unit for executing the methods according to the second aspect or any optional implementation of the second aspect as such.

In a sixth aspect, a device for transmitting data is provided, including a unit for executing the methods according to the third aspect or any optional implementation of the third aspect as such.

In a seventh aspect, a device for transmitting data is provided, including a memory, a processor and a transceiver; the memory is configured to store programs, and the processor is configured to execute the programs, and when the programs are executed, the processor executes the methods according to the first aspect or any optional implementation of the first aspect as such based on the transceiver.

In an eighth aspect, a device for transmitting data is provided, including a memory, a processor and a transceiver; the memory is configured to store programs, and the processor is configured to execute the programs, and when the programs are executed, the processor executes the methods according to the second aspect or any optional implementation of the second aspect as such based on the transceiver.

In a ninth aspect, a device for transmitting data is provided, including a memory, a processor and a transceiver; the memory is configured to store programs, and the processor is configured to execute the programs, and when the programs are executed, the processor executes the methods according to the third aspect or any optional implementation of the third aspect as such based on the transceiver.

In a tenth aspect, a computer readable medium is provided, the computer readable medium stores program code executed by a terminal device, and the program code includes instructions for executing the methods according to the first aspect or any optional implementation of the first aspect as such.

In a eleventh aspect, a computer readable medium is provided, the computer readable medium stores program code executed by a terminal device, and the program code includes instructions for executing the methods according to the second aspect or any optional implementation of the second aspect as such.

In a twelfth aspect, a computer readable medium is provided, the computer readable medium stores program code executed by a terminal device, and the program code includes instructions for executing the methods according to the third aspect or any optional implementation of the third aspect as such.

In a thirteenth aspect, a computer program product including instructions is provided, which, when executed on a computer, causes the computer to perform the methods according to the first aspect or any optional implementation of the first aspect as such.

In a fourteenth aspect, a computer program product including instructions is provided, which, when executed on a computer, causes the computer to perform the methods according to the second aspect or any optional implementation of the second aspect as such.

In a fifteenth aspect, a computer program product including instructions is provided, which, when executed on a computer, causes the computer to perform the methods according to the third aspect or any optional implementation of the third aspect as such.

BRIEF DESCRIPTION OF THE DRAWINGS

FIG. 1 is a schematic diagram of a wireless communication system according to an embodiment of the present application.

FIG. 2 is a schematic flowchart of a method for transmitting data according to an embodiment of the present application.

FIG. 3 is a schematic flowchart of a method for transmitting data according to another embodiment of the present application.

FIG. 4 is a schematic flowchart of a method for transmitting data according to still another embodiment of the present application.

DESCRIPTION OF EMBODIMENTS

Figure 5:
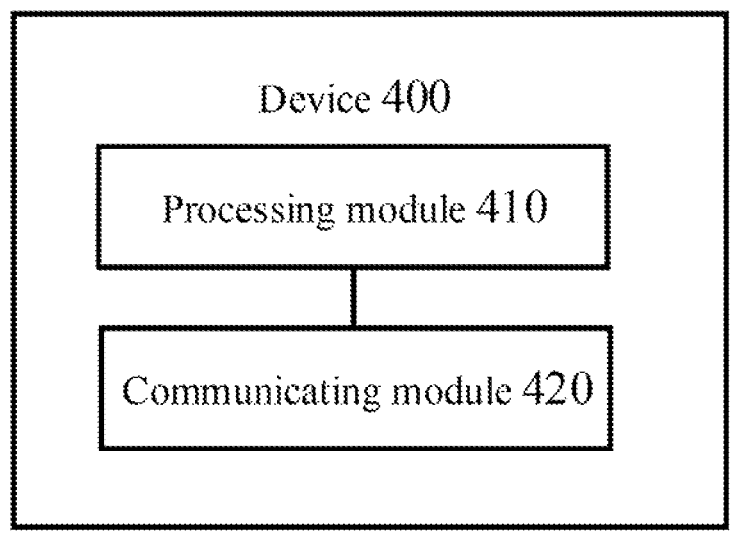
FIG. 5 is a schematic block diagram of a device for transmitting data according to an embodiment of the present application.

Technical solutions of the embodiments of the present application will be described below in conjunction with the accompanying drawings.

The technical solutions of the embodiments of the present application may be applied to various communication systems, such as Global System for Mobile Communications (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), World Interoperability for Microwave Access (WiMAX) communication system, the future 5G system, and the like.

FIG. 1 shows a wireless communication system 100 applied in an embodiment of the present application. The wireless communication system 100 may include a network device 110. The network device 100 may be a device that communicates with a terminal device. The network device 100 may provide communication coverage for a particular geographic area and may communicate with terminal devices (e.g., UE) located within the coverage. In some embodiments, the network device 100 may be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Alternatively, the network device can be a relay station, an access point, a vehicle-mounted device, a wearable device, a network-side device in the future 5G network or a network device in a future evolved Public Land Mobile Network (PLMN), and the like.

The wireless communication system 100 further includes at least one terminal device 120 located within the coverage of the network device 110. The terminal device 120 may be mobile or stationary. In some embodiments, the terminal device 120 can refer to an access terminal, a User Equipment (UE), a subscriber unit, a subscriber station, a mobile station, a mobile table, a remote station, a remote terminal, a mobile device, a user terminal, a terminal, a wireless communication device, a user agent or a user device. The access terminal can be a cellular phone, a cordless phone, a Session Initiation Protocol (SIP) telephone, a wireless local loop (WLL) station, a personal digital assistant (PDA), a handheld device having wireless communication capability, a computing device or other processing devices connected to a wireless modem, a vehicle-mounted device, a wearable wireless device, a terminal device in future 5G networks or a terminal device in future evolved PLMN, and the like.

In some embodiments, a 5G system or network can also be referred to as a NR system or network.

The following is a brief introduction to the background knowledge related to the embodiments of the present application.

A Radio Link Control (RLC) layer is located between a Packet Data Convergence Protocol (PDCP) layer and a Media Access Control (MAC) layer. The RLC layer communicates with the PDCP layer through a Service Access Point (SAP) and the MAC layer through a logical channel. Each logical channel of each UE has an RLC entity. Data received by the RLC entity from the PDCP layer, or sent to the PDCP layer, is referred to as RLC SDU or PDCP PDU. Data received by the RLC entity from the MAC layer, or sent to the MAC layer, is referred to as RLC PDU or MAC SDU.

If the RLC PDU received by a receiving end (which can be a terminal or a network device) at a reordering window is disorderly, it needs to be reordered first and then delivered to the PDCP layer. The disorderly arrived RLC PDU will be stored in a receiving buffer first, until previous RLC PDUs have been successfully received and delivered to the PDCP layer.

When receiving RLC PDU data, the receiving end needs to detect which RLC PDU has been missed. In order to avoid excessive reordering delay, a reordering timer (t_Reordering) can be triggered to wait for the missed RLC PDU. Briefly, the receiving end will only wait for the RLC PDU that has not been received for a period of time. If the RLC PDU is not received after the period of time, the receiving end will not continue to wait. T_reordering determines a time to wait for a PDU not received. In an existing LTE protocol, a behavior of t_Reordering is specified, that is, a start condition, a stop condition, a trigger condition, and a behavior after the trigger, and the like. In summary, the purpose of t_Reordering is to ensure that the data packets in the reordering window are delivered to the PDCP layer in order.

However, it does not need to deliver in order for all the cases. For example, if the PDCP layer has an ordering capability, the disordered data delivered by the RLC can be reordered by the PDCP layer, and then the RLC layer can timely deliver the received data to the PDCP layer for the PDCP layer to process the data.

In view of this, an embodiment of the present application provides a method for transmitting data, which provides a timely delivery mode, thereby achieving timely delivery of data from the RLC layer to the PDCP layer.

FIG. 2 is a schematic flowchart of a method 200 for transmitting data proposed in an embodiment of the present application, the method 200 can be executed by the terminal device or the network device in the wireless communication system shown in FIG. 1. As shown in FIG. 2, the method 20) includes:

S210, a receiving end starts a timer of a first delivery mode when determining that delivered data and data to be delivered are not continuous, where the first delivery mode is used to indicate that the receiving end directly delivers data to an upper layer upon receipt of the data and S220, the receiving end delivers the data to be delivered to the upper layer using the first delivery mode when the timer of the first delivery mode does not expire.

In the existing technology, when the delivered data and the data to be delivered are not continuous, that is, there is a gap between the delivered data and the data to be delivered, the receiving end will store the data to be delivered in a buffer until data after the delivered data and before the data to be delivered, that is data of the gap part, is successfully delivered to the upper layer, and then the data to be delivered is delivered to the upper layer. Therefore, timely delivery of the data to be delivered cannot be achieved.

In the embodiment of the present application, the receiving end is capable of starting the timer of the first delivery mode when the delivered data and the data to be delivered are not continuous, thereby delivering the data to the upper layer using the first delivery mode. In the first delivery mode, after receiving the data, the receiving end does not need to store the discontinuous data in a receiving buffer, but can directly deliver the data to the upper layer. Therefore, in the first delivery mode, it does not need to use the receiving buffer, thus saving system resources.

It should be noted that the directly delivering the data to the upper layer mentioned here may be directly delivering received RLC PDU data to the upper layer, or reorganizing the received RLC PDU data to obtain RLC SDU, and then delivering the RLC SDU to the upper layer. The upper layer mentioned here can be a PDCP layer, the first delivery mode can also be referred to as a timely delivery mode, or a real-time delivery mode, and the like.

When the timer of the first delivery mode is running, or when the timer of the First delivery mode is in an operating state, the receiving end can always use the timely delivery mode to deliver data to the upper layer. That is, after receiving the data, it is delivered directly to the upper layer until the timer of the first delivery mode is stopped or expired.

When the time is longer than the duration of the timer, the timer expires. If the time does not longer the duration of the timer, but a stop condition is met, the timer is stopped. When the timer is in an expired state or a stopped state, or when the timer is not in the operating state, the receiving end does not deliver the data to the upper layer in the timely delivery mode, but delivers the data to the upper layer in an orderly delivery mode in the prior art.

In in some embodiments, the method 200 may further include:

the receiving end stops the timer of the first delivery mode when determining that the delivered data and the data to be delivered are continuous, if the timer of the first delivery mode is running.

Generally, a start condition of the timer of the first delivery mode may be that the data to be delivered and the delivered data are not continuous, and the stop condition of the timer of the first delivery mode may be that the data to be delivered and the delivered data are continuous. That is, when the timer of the first delivery mode is in a non-operating state, the receiving end may start the timer of the first delivery mode when the data to be delivered and the data delivered are not continuous, thus delivering the data to the upper layer using the timely delivery mode, and when the data to be delivered and the delivered data are continuous, the receiving end may deliver the data to the upper layer using the delivery mode in the prior art, that is, in the orderly delivery mode.

This is, when the timer of the first delivery mode is in the non-operating state, the start condition of the timer of the first delivery mode may be that the data to be delivered and the delivered data are not continuous, and when the timer of the first delivery mode is in the operating state, the stop condition of the timer of the first delivery mode may be that the data to be delivered and the delivered data are continuous.

When the timer of the first delivery mode is stopped, the receiving end resets the duration of the timer of the first delivery mode to zero, so that the timer of the first delivery mode is in the non-operating state. When the duration of the timer of the first delivery mode is set to a value greater than zero, the timer of the first delivery mode is started and the timer of the first delivery mode is in the operating state. When the timer of the first delivery mode is started, after receiving data in a reordering window, the receiving end delivers the data directly to the upper layer. Even if there is a packet loss, there is no waiting for packet loss. As long as new data arrives, the received new data can be delivered to the upper layer.

As an embodiment, the method 200 further includes: the receiving end determines whether the delivered data and the data to be delivered are continuous according to the window information of a reordering window and information of the delivered data.

The window information of the reordering window may include information of the reordering window, such as window lower bound identification, window upper bound identification and window size, and the like. The size of the reordering window is configured to indicate a number of PDU that can be received without window movement.

For example, the window lower bound identification of the reordering window may be a Sequence Number (SN) of a next PDU waiting to be received, or a next SN of a highest SN in the received PDU, if a SN of a packet is smaller than the window lower bound identification of the reordering window, that is, the SN of the data packet is outside the reordering window, then the packet can be considered as having been successfully received and delivered to the upper layer, and the window upper bound identification of the window can be the window lower bound identification+window size. For example, if a maximum SN of the received data packet is 50, the window lower bound identification can be SN+1=51, and if the window size is 512, the window upper bound identification can be 51+512=563.

In this case, the movement of the reordering window is mainly driven by the window lower bound, that is, only when the data packet of the window lower bound is successfully received and delivered to the upper layer, or when the reordering timer expires, the window moves backwards. Therefore, the window lower bound identification of the reordering window can indicate information of the data to be delivered. For example, a minimum SN of the data to be delivered. In this way, the receiving end determines, according to the minimum SN of the data to be delivered and the maximum SN of the delivered data, whether the two are continuous, thereby determining whether the data to be delivered and the delivered data are continuous.

Therefore, in the embodiment of the present application, a SN of a RLC SDU last delivered by the receiving end to the upper layer is denoted as Last_Delivered_PDCP_RX_SN. The receiving end determines whether the data to be delivered and the delivered data are continuous according to the SN of the SDU last delivered to the upper layer in conjunction with the SN indicated by the window lower bound identification of the reordering window.

Specifically, since SN has a range, when it is larger than the range, SN will be counted again. The current Hyper Frame Number (HFN), denoted as RX_HFN, can be used to record a recount times. Therefore, according to the SN of the last delivered SDU and in conjunction with RX_HFN, the receiving end can determine a count value (COUNT) corresponding to the last delivered SDU, that is, the serial number of the SDU actually delivered by the receiving end to an upper layer. The same method can be used to calculate the corresponding count value according to the window lower bound identification, that is, the count value corresponding to the minimum SN of the data to be delivered.

In some embodiments, the receiving end determines whether the delivered data and the data to be delivered are continuous according to the window information of the reordering window and the information of the delivered data, includes:

determining that the delivered data and the data to be delivered are not continuous if a count value corresponding to the window lower bound identification is not equal to a count value corresponding to a next SN of the SN of the last delivered SDU; or determining that the delivered data and the data to be delivered are continuous if the count value corresponding to the window lower bound identification is equal to the count value corresponding to the next SN of the SN of the last delivered SDU.

The count value corresponding to the window lower bound identification can reflect an actual serial number value of the data to be delivered, and the count value corresponding to the SN of the last delivered SDU can reflect an actual serial number value of the last delivered SDU. By comparing whether the two count values are continuous, it can be determined whether the delivered data and the data to be delivered are continuous. For example, the count value corresponding to the window lower bound identification is COUNT1, and the count value corresponding to the SN of the last delivered SDU is COUNT2. If COUNT1=COUNT2+1, then it can be determined that the delivered data and the data to be delivered are continuous, otherwise, it is determined that the delivered data and the data to be delivered are not continuous.

It should be understood that, in a specific implementation, the window lower bound identification may be set as the SN of the last delivered SDU. When performing such comparison, it can be determined that the delivered data and the data to be delivered are not continuous when the count value corresponding to the window lower bound identification is not equal to the count value corresponding to the SN of the last delivered SDU, and it can be determined that the delivered data and the data to be delivered are continuous when the count value corresponding to the window lower bound identification is equal to the count value corresponding to the SN of the last delivered SDU. That is, the specific judgment condition can be adjusted according to a definition of the window lower bound identification, which is not specifically limited by the embodiment of the present application.

As an embodiment, the method 200 further includes:

setting a window lower bound identification of a reordering window to a count value corresponding to an SDU that is expected to be delivered next time when the timer of the first delivery mode is in an expired state.

The timer of the first delivery mode being in the expired state may be understood as that the timer of the first delivery mode is in the non-operating state.

Specifically, the receiving end can set the window lower bound identification of the reordering window to a count value corresponding to the count value corresponding to the SDU that is expected to be delivered next time (denoted as Next_PDCP_RX_SN). For example, the receiving end can determine the corresponding COUNT value according to the Next_PDCP_RX_SN in conjunction with the current RX_HFN of the receiving end. Then, when the timer of the first delivery mode is in the expired state, the receiving end can start the timer of the first delivery mode when the count value corresponding to the SDU that is expected to be delivered next time is not equal to the count value corresponding to the last delivered SDU, that is, when the data to be delivered and the delivered data are not continuous, so that the data can be data delivered to the upper layer using the timely delivery mode.

It should be understood that, in the embodiment of the present application, the receiving end may be a terminal device or a network device, which is not specifically limited in the embodiment of the present application.

If the receiving end is a terminal device, as an embodiment, the method 200 may further include:

the receiving end receives the indication information sent by a network device, where the indication information is used to indicate that the terminal device delivers data to the upper layer using the first delivery mode or a second delivery mode, where the second delivery mode is used to indicate that the receiving end delivers data to the upper layer in order.

That is, when the receiving end is a terminal device, which delivery mode to be specifically used can be configured by the network device to the terminal device. The network device can configure the delivery mode for the terminal device to deliver data to the upper layer according to factors such as system requirements or upper layer processing capabilities, and the like. For example, the network device can configure the terminal device to use the first delivery mode, that is, the timely delivery mode, to deliver data to the upper layer in a case of high delay requirements, so as to reduce a delay of data transmission. Alternatively, when the processing capability of the upper layer is strong, the data is delivered to the upper layer using the timely delivery mode. That is, the disordered data is delivered directly to the upper layer and reordered by the upper layer.

In some embodiments, the indication information is specifically used to indicate that a packet data convergence protocol PDCP layer of the terminal device delivers data to the upper layer using the first delivery mode or the second delivery mode.

In some embodiments, the indication information is specifically used to indicate that a radio link control RLC layer of the terminal device delivers data to the upper layer using the first delivery mode or the second delivery mode.

That is, the indication information for indicating the delivery mode used by the RLC layer of the terminal device and the indication information for indicating the delivery mode used by the PDCP layer of the terminal device can be carried in a same indication domain. For example, they may be carried in a specific indication domain of RRC signaling or dynamic signaling. That is, the same indication information may be used to indicate which delivery mode is used by the RLC layer and PDCP layer of the terminal device.

As an embodiment, the receiving end receives the indication information sent by the network device, includes:

the receiving end receives a radio resource control RRC signaling sent by the network device, where the radio resource control signaling includes the indication information.

That is, the network device may semi-statically configure which delivery mode to be used for the receiving end through the RRC signaling.

As another embodiment, the receiving end receives the indication information sent by the network device, includes:

the receiving end receives a media access control MAC control element CE or a packet data convergence protocol PDCP control protocol data unit (PDU), sent by the network device, where the MAC CE or PDCP control PDU includes the indication information.

That is to say, the network device can dynamically configure which delivery mode the terminal device uses to deliver data to the upper layer through a dynamic signaling, for example, MAC CE or PDCP control PDU.

In some embodiments, the network device can also send the indication information to the receiving end in other ways, and the embodiment of the present application does not limit the specific notification mode of the indication information.

Therefore, in the method for transmitting data in the embodiment of the present application, the receiving end can start the timer of the timely delivery mode when the data to be delivered and the delivered data are not continuous, so as to realize timely delivery of data to the upper layer, which is conducive to realize timely data delivery and reduce the delay of data transmission.

It should be noted that, in the embodiment of the present application, no matter which delivery mode is used, when the receiving end receives the Protocol Data Unit (PDU) data, it needs to perform de-header (or decapsulation) processing on the PDU data to generate SDU data, and then the SDU data can be delivered to the upper layer. The process of generating SDU data from PDU data is omitted for the convenience of description, but it does not mean that the process is not executed.

In an embodiment of the present application, the receiving end can generate the SDU data according to multiple PDUs, where, multiple PDUs may constitute a complete SDU, or may constitute part of a complete SDU. Alternatively, part of the multiple PDUs may constitute a complete SDU. That is, the SDU data may be generated by at least one PDU, which is capable of constituting a complete SDU, and a previous (and/or posterior) PDU of the at least one PDU.

That is, the receiving end can generate SDU data from at least one PDU, which is capable of constituting a complete SDU, and a previous PDU of the at least one PDU, or the receiving end may generate SDU data from at least one PDU, which is capable of constituting a complete SDU, and a posterior PDU of the complete PDU, or the receiving end may also generate an SDU data from the at least one PDU, the previous PDU of the at least one PDU, and the posterior PDU of the at least one PDU, and the like. The embodiment of the present application does not specifically limit the generation mode of the SDU.

In the first delivery mode, after the SDU data is generated, the receiving end directly delivers the SDU data to the upper layer, even if previous SDU data of the SDU data has not been delivered to the upper layer. That is, the receiving end can disorderly deliver the SDU data to the upper layer.

In the second delivery mode, after the SDU data is generated, the receiving end needs to wait for all previous SDU data of the SDU data are delivered to the upper layer, and then the SDU data can be delivered to the upper layer. That is, the receiving end needs to deliver SDU data to the upper layer in order.

FIG. 3 is a schematic flowchart of a method 300 for transmitting data in another embodiment of the present application. The method 300 can be executed by the terminal device or the network device in the wireless communication system shown in FIG. 1. As shown in FIG. 3, the method 300 includes:

S310, a receiving end sets a duration of a timer of a second delivery mode to zero; and S320, the receiving end deliver data to be delivered to an upper layer using a first delivery mode;

where the first delivery mode is used to indicate that the receiving end directly delivers the data to the upper layer upon the receipt of the data, and the second delivery mode is used to indicate that the receiving end delivers data to the upper layer in order.

In this embodiment, a window upper bound identification of a reordering window may be a next SN number of a highest SN number in the received PDU. If a SN of a data packet is larger than the window upper bound identification of the reordering window, that is, the SN of the data packet is outside the reordering window, then the data packet can be considered as having not been successfully received. If the receiving end receives a data packet whose SN is larger than the current window upper bound identification, then the receiving end can update the window upper bound identification as the SN of the newly received data packet, that is, the window is moved backwards.

That is to say, the movement of the reordering window is mainly driven by the upper bound of the window, that is, as long as the receiving end receives a data packet with a larger SN, the window will move backwards. In this case, the receiving end only needs to set the duration of the timer of the second delivery mode, that is, an orderly delivery mode, to zero. When the duration of the timer of the sequential delivery mode is zero, the timer is in a non-operating state. Therefore, even if there is packet loss, there is no waiting for the packet loss, so that the window will move backwards following receipt of a new data packet. Accordingly, when receiving a new data packet, the receiving end can directly deliver the newly received data packet to the upper layer, thus realizing timely delivery of the received data packet.

Therefore, in this scenario, the receiving end does not need to determine whether the delivered data and the data to be delivered are continuous, as long as the duration of the timer of the second delivery mode is set to 0, the timely delivery of the received data packet can be realized. Alternatively, if the data need to be delivered in order, it only need to set the duration of the timer of the second delivery mode to a value greater than zero. Therefore, the receiving end can switch between the timely delivery mode and the orderly delivery mode by controlling the duration of the tinier of the second delivery mode.

It should be noted that, in the embodiment of the present application, no matter which delivery mode is used, when the receiving end receives the Protocol Data Unit (PDU) data, it needs to perform de-header (or decapsulation) processing on the PDU data to generate Service Data Unit (SDU) data, and then the SDU data can be delivered to the upper layer. The process of generating SDU data from PDU data is omitted for the convenience of description, but it does not mean that the process is not executed.

In an embodiment of the present application, the receiving end can generate the SDU data according to multiple PDUs, where, the multiple PDUs may constitute a complete SDU, or may constitute part of a complete SDU. Alternatively, part of the multiple PDUs may constitute a complete SDU. That is, the SDU data may be generated by at least one PDU, which is capable of constituting a complete SDU, and a previous (and/or posterior) PDU of the at least one PDU.

That is, the receiving end can generate SDU data from at least one PDU, which is capable of constituting a complete SDU, and a previous PDU of the at least one PDU, or the receiving end may generate SDU data from at least one PDU, which is capable of constituting a complete SDU, and a posterior PDU of the complete PDU, or the receiving end may also generate an SDU data from the at least one PDU, the previous PDU of the at least one PDU, and the posterior PDU of the at least one PDU, and the like. The embodiment of the present application does not specifically limit the generation mode of the SDU.

In the first delivery mode, after the SDU data is generated, the receiving end directly delivers the SDU data to the upper layer, even if previous SDU data of the SDU data has not been delivered to the upper layer. That is, the receiving end can disorderly deliver the SDU data to the upper layer.

In the second delivery mode, after the SDU data is generated, the receiving end needs to wait for all previous SDU data of the SDU data are delivered to the upper layer, and then the SDU data can be delivered to the upper layer. That is, the receiving end needs to deliver SDU data to the upper layer in order.

FIG. 4 is a schematic flowchart of a method 700 for transmitting data in still another embodiment of the present application. The method 700 can be executed by the terminal device in the wireless communication system shown in FIG. 1. As shown in FIG. 4, the method 700 includes:

S710, a terminal device receives indication information sent by a network device, where the indication information is used to indicate that a packet data convergence protocol PDCP layer and a radio link control RLC layer of the terminal device deliver data to an upper layer using a first delivery mode or a second delivery mode, where the first delivery mode is used to indicate that the terminal device directly generates service data unit SDU data and deliver the SDU data to the upper layer upon receipt of PDU data, and the second delivery mode is used to indicate that the terminal device delivers data to the upper layer in order, and S720, deliver the SDU data to the upper layer according to the indication information.

Therefore, in the embodiment of the present application, the indication information for indicating the delivery mode used by the RLC layer of the terminal device and the indication information for indicating the delivery mode used by the PDCP layer of the terminal device can be carried in a same indication domain. For example, they may be carried in a specific indication domain of RRC signaling or dynamic signaling. That is, the same indication information may be used to indicate which delivery mode is used by the RLC layer and PDCP layer of the terminal device. It should be understood that, no matter which delivery mode is used, upon receipt of the PDU data, the receiving end needs to perform de-header processing on the PDU data to generate the SDU data, and then the SDU data can be delivered to the upper layer.

In the embodiment of the present application, the receiving end may receive multiple PDUs, and the receiving end may perform de-header processing on the multiple PDUs to generate an SDU, where, the multiple PDUs may constitute a complete SDU, or may constitute part of a complete SDU. Alternatively, part of the multiple PDUs may constitute a complete SDU. That is, the SDU data may be generated by at least one PDU, which is capable of constituting a complete SDU, and a previous (and/or posterior) PDU of the at least one PDU.

For example, if the receiving end receives PDU 1, PDU 2 and PDU 3, which constitute a complete SDU, the receiving end may perform de-header processing on the PDU 1, PDU 2 and PDU 3 and generate a complete SDU.

Alternatively, if the receiving end receives PDU 4, PDUS and PDU 6, the PDU 5 is a complete SDU (denoted as SDU1), the PDU 4 and PDU 6 may be segments of other SDUs other than SDU1, the PDU 4 and PDU 6 may belong to a same SDU or may belong to different SDUs, then the receiving end may also perform de-header processing on the PDU 4, PDU 5 and PDU 6 to generate an SDU.

In the first delivery mode, after the SDU data is generated, the receiving end directly delivers the SDU data to the upper layer, even if previous SDU data of the SDU data has not been delivered to the upper layer. That is, the receiving end can disorderly deliver the SDU data to the upper layer.

In the second delivery mode, after the SDU data is generated, the receiving end needs to wait for all previous SDU data of the SDU data are delivered to the upper layer, and then before the SDU data can be delivered to the upper layer, That is, the receiving end needs to deliver SDU data to the upper layer in order.

The method embodiments of the present application are described in detail above with reference to FIGS. 2 to 4. Hereinafter, device embodiments of the present application will be described in detail with reference to FIGS. 5 to 8. It should be understood that the device embodiments and the method embodiments correspond to each other, and similar descriptions can refer to the method embodiments.

FIG. 5 is a schematic block diagram of a device for transmitting data according to an embodiment of the present application. The device 400 of FIG. 5 includes:

a processing module 410, configured to start a timer of a first delivery mode when determining that delivered data and data to be delivered are not continuous, where the first delivery mode is used to indicate that the device directly delivers data to an upper layer upon receipt of the data; and a communicating module 420, configured to deliver the data to be delivered to the upper layer using the first delivery mode when the timer of the first delivery mode does not expire.

In some embodiments, the processing module 410 is further configured to:

stop the timer of the first delivery mode when determining that the delivered data and the data to be delivered are continuous, if the timer of the first delivery mode is running.

In some embodiments, the device further includes:

a determining module, configured to determine whether the delivered data and the data to be delivered are continuous according to window information of a reordering window and information of the delivered data.

In some embodiments, the window information of the reordering window includes a window lower bound identification of the reordering window, and the determining module is specifically configured to:

determine whether the delivered data and the data to be delivered are continuous according to the window lower bound identification of the reordering window and a serial number SN of a last delivered service data unit SDU.

In some embodiments, the determining module is specifically configured to:

determine that the delivered data and the data to be delivered are not continuous if a count value corresponding to the window lower bound identification is not equal to a count value corresponding to a next SN of the SN of the last delivered SDU; or determine that the delivered data and the data to be delivered are continuous if the count value corresponding to the window lower bound identification is equal to the count value corresponding to the next SN of the SN of the last delivered SDU.

In some embodiments, the processing module 410 is further configured to:

set a window lower bound identification of a reordering window to a count value corresponding to an SDU that is expected to be delivered next time when the timer of the first delivery mode is in an expired state.

In some embodiments, the processing module 410 is further configured to:

start the timer of the first delivery mode when the count value corresponding to the SDU that is expected to be delivered next time is not equal to the count value corresponding to the last delivered SDU delivered last time.

In some embodiments, the device is a terminal device or a network device.

In some embodiments, the device is a terminal device, and the communicating module 420 is further configured to:

receive indication information sent by a network device, where the indication information is used to indicate that the device delivers data to the upper layer using the first delivery mode or a second delivery mode, where the second delivery mode is used to indicate that the device delivers data to the upper layer in order.

In some embodiments, the indication information is specifically configured to indicate that a packet data convergence protocol PDCP layer of the device delivers data to the upper layer using the first delivery mode or the second delivery mode.

In some embodiments, the indication information is specifically configured to indicate that a radio link control RLC layer of the device delivers data to the upper layer using the first delivery mode or the second delivery mode.

In some embodiments, communicating module 420 is specifically configured to:

receive a radio resource control RRC signaling sent by the network device, where the radio resource control signaling includes the indication information.

In some embodiments, the communicating module 420 is specifically configured to:

receive a media access control MAC control element CE or a packet data convergence protocol PDCP control protocol data unit PDU, sent by the network device, where the MAC CE or PDCP control PDU includes the indication information.

Specifically, the device 400 may correspond to (e.g., may be configured at or be itself) the receiving end described in the above method 200. In addition, modules or units in the device 400 are respectively configured to execute the actions or processing procedures executed by the receiving end in the above method 200. Here, detailed description thereof will be omitted to avoid repetition.

Figure 6:
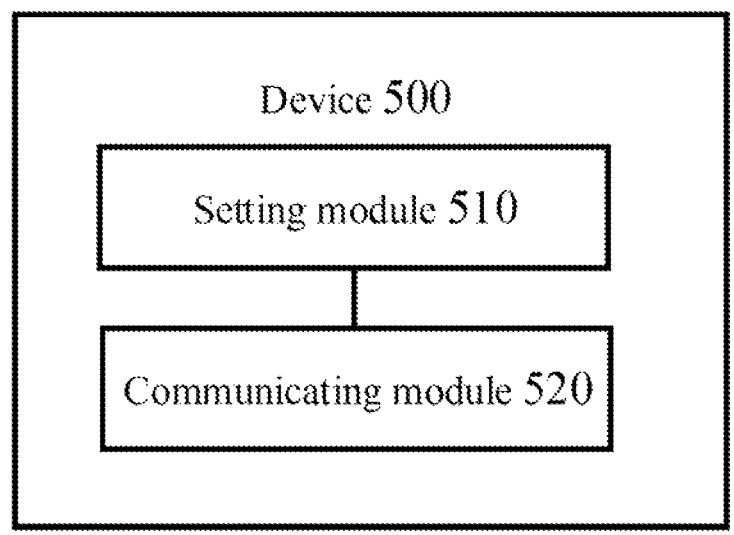
FIG. 6 is a schematic block diagram of a device for transmitting data according to another embodiment of the present application.

FIG. 6 is a schematic block diagram of a device for transmitting data according to an embodiment of the present application. The device 500 of FIG. 6 includes:

a setting module 510, configured to set a duration of a timer of a second delivery mode to zero; and a communicating module 520, configured to deliver data to be delivered to an upper layer using a first delivery mode;

where the first delivery mode is used to indicate that the device directly delivers the data to the upper layer upon receipt of the data, and the second delivery mode is used to indicate that the device to delivers data to the upper layer in order.

Specifically, the device 500 may correspond to (e.g., may be configured at or be itself) the receiving end described in the above method 300. In addition, modules or units in the device 500 are respectively configured to execute the actions or processing procedures executed by the receiving end in the above method 300. Here, detailed description thereof will be omitted to avoid repetition.

Figure 7:
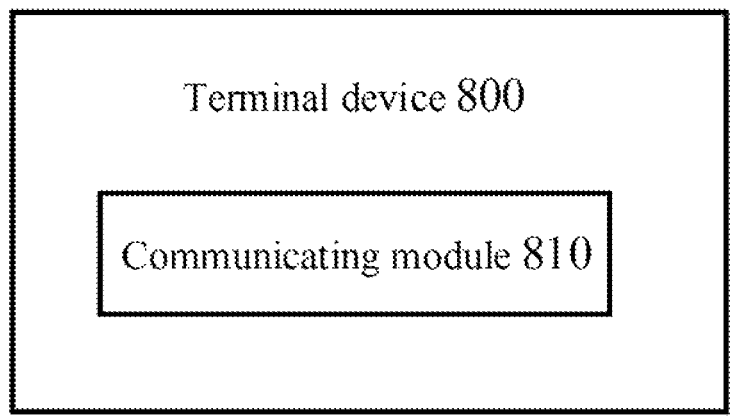
FIG. 7 is a schematic block diagram of a device for transmitting data according to still another embodiment of the present application.

FIG. 7 is a schematic block diagram of a terminal device for transmitting data according to an embodiment of the present application. The terminal device 800 of FIG. 7 includes:

a communicating module 810, configured to receive indication information sent by a network device, where the indication information is used to indicate that a packet data convergence protocol PDCP layer and a radio link control RLC layer of the terminal device deliver data to an upper layer using a first delivery mode or a second delivery mode, where the first delivery mode is used to indicate that the terminal device directly generates service data unit SDU data and deliver the SDU data to the upper layer upon receipt of protocol data unit PDU data, and the second delivery mode is used to indicate that the terminal device delivers data to the upper layer in order; and deliver the SDU data to the upper layer according to the indication information.

Specifically, the terminal device 800 may correspond to (e.g., may be configured at or be itself) the receiving end described in the above method 700. In addition, modules or units in the terminal device 800 are respectively configured to execute the actions or processing procedures executed by the terminal device in the above method 700. Here, detailed description thereof will be omitted to avoid repetition.

Figure 8:
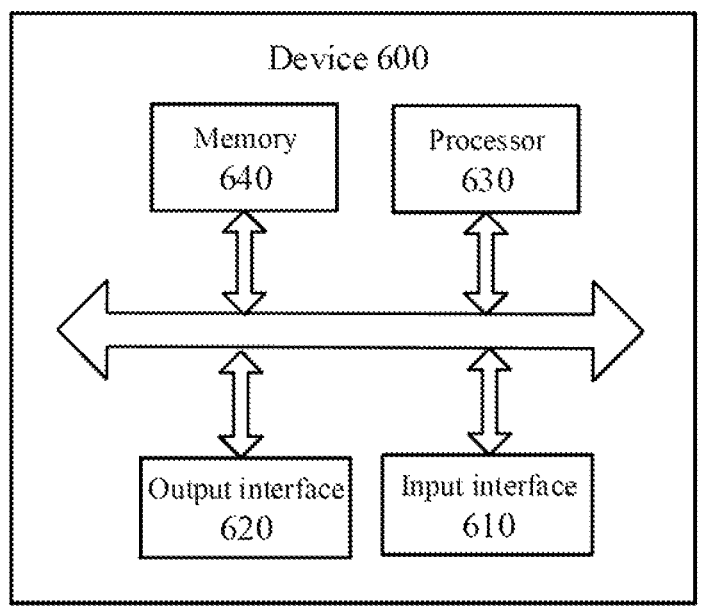
FIG. 8 is a schematic block diagram of a device for transmitting data according to an embodiment of the present application.

As shown in FIG. 8, an embodiment of the present application further provides a device 600 for transmitting data. The device 600 can be the device 400 in FIG. 5, or the device 500 in FIG. 6, or the device 800 in FIG. 7, which can be configured to execute the content of the receiving end corresponding to the method 200 in FIG. 2, or the method 300 in FIG. 3, or the content of the terminal device corresponding to the method 700 in FIG. 4. The device 600 includes: an input interface 610, an output interface 620, a processor 630 and a memory 640, the input interface 610, output interface 620, processor 630 and memory 640 can be connected through a bus system. The memory 640 is configured to store programs, instructions or codes. The processor 630 is configured to execute the programs, instructions or codes in the memory 640 to control the input interface 610 to receive a signal, control the output interface 620 to send a signal, and complete the operations in the foregoing method embodiments.

It should be understood that in the embodiments of the present application, the processor 630 may be a Central Processing Unit (CPU), and the processor 630 may also be other general purpose processors, digital signal processors (DSPs), application specific integrated circuits (ASICs), field programmable gate arrays (FPGAs) or other programmable logic devices, discrete gates or transistor logic devices, discrete hardware components, and the like. The general purpose processor may be a microprocessor or the processor may also be any conventional processors, and the like.

The memory 640 may include a read only memory and a random access memory, and provide instructions and data to the processor 630. A portion of memory 640 may also include a non-volatile random access memory. For example, the memory 640 may also store device type information.

During an implementation, contents of the above method can be completed by an integrated logic circuit of hardware or instructions in the form of software in the processor 630. The content of the method disclosed in connection with the embodiment of the application may be directly implemented by a hardware processor, or in the combination of hardware and software modules in the processor. Software modules can be located in mature storage media in the art, such as a random access memory, a flash memory, a read only memory, a programmable read only memory or an electrically erasable programmable memory, a register, and the like. The storage medium is located in the memory 640. The processor 630 reads the information in the memory 640 and completes the contents of the above method with reference to its hardware, which will not be described in detail herein to avoid repetition.

In a specific embodiment, the processing module 410 included in the device 400 in FIG. 5 may be implemented by the processor 630 in FIG. 8, and the communicating module 420 included in the device 400 in FIG. 5 may be implemented by the input interface 610 and the output interface 620 in FIG. 8.

In another specific embodiment, the setting module 510 included in the device 500 in FIG. 6 may be implemented by the processor 630 in FIG. 8, and the communicating module 520 included in the device 500 in FIG. 6 may be implemented by the input interface 610 and the output interface 620 in FIG. 8.

In a further specific embodiment, the communicating module 810 included in the device 800 in FIG. 7 may be implemented by the input interface 610 and the output interface 620 in FIG. 8.

An embodiment of the present application further provides a computer readable storage medium storing one or more programs, where the one or more programs include instructions, which, when executed by a portable electronic device including multiple applications, enable the portable electronic device to execute the methods of the embodiments shown in FIGS. 2 to 4.

An embodiment of the present application further provides a computer program including instructions, which, when executed by a computer, enable the computer to execute the corresponding flow of the methods of the present embodiments shown in FIGS. 2 to 4.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those skilled in the art can clearly understand that, for convenience and brevity of the description, for specific operation processes of the systems, the apparatuses and the units described above, reference may be made to the corresponding processes in the above method embodiments, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solutions of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or a network device, etc.) to perform all or part of the steps of the embodiments of the present application. The above storage medium includes: various mediums capable of storing program codes, such as a USB flash disk, a mobile hard disk, a read-only memory (ROM), a random access memory (RAM), a magnetic disk, an optical disk, or the like.

The above description is only specific embodiments of the present application, but the protection scope of the present application is not limited thereto. Any modification or the substitution conceived by persons skilled in the art within the technical scope of the present application should be covered in the protection scope of the present application. Therefore, the protection scope of the present application is subject to the protection scope of the appended claims.

What is claimed is:

1. A method for transmitting data, comprising:
   starting, by a receiving end, a timer of a first delivery mode when determining that delivered data and data to be delivered are out of order, wherein the first delivery mode is used to indicate that the receiving end directly delivers data to an upper layer upon receipt of the data;

delivering, by the receiving end, the data to be delivered to the upper layer using the first delivery mode when the timer of the first delivery mode has not expired; and setting a window lower bound identification of a reordering window to a count value corresponding to a service data unit (SDU) that is expected to be delivered next time when the timer of the first delivery mode is in an expired state;

wherein the starting, by the receiving end, the timer of the first delivery mode when determining that the delivered data and the data to be delivered are out of order, comprises:

starting the timer of the first delivery mode when the count value corresponding to the SDU that is expected to be delivered next time is not equal to a next count value of the count value corresponding to a last delivered SDU.

2. The method of claim 1, further comprising:

stopping, by the receiving end, the timer of the first delivery mode, upon determining that the delivered data and the data to be delivered are in order under a condition that the timer of the first delivery mode is running.

3. The method of claim 1, further comprising:

determining, by the receiving end, whether the delivered data and the data to be delivered are in order according to window information of the reordering window and information of the delivered data.

4. The method of claim 1, wherein the receiving end is a terminal device or a network device.

5. The method of claim 4, wherein the receiving end is a terminal device, and the method further comprises:

receiving, by the receiving end, indication information sent by a network device, wherein the indication information is used to indicate that the terminal device delivers data to the upper layer using the first delivery mode or a second delivery mode, wherein the second delivery mode is used to indicate that the receiving end delivers data to the upper layer in order.

6. The method of claim 5, wherein the indication information is configured to indicate at least one of the following:

a packet data convergence protocol (PDCP) layer of the terminal device delivers data to the upper layer using the first delivery mode or the second delivery mode; and a radio link control (RLC) layer of the terminal device delivers data to the upper layer using the first delivery mode or the second delivery mode.

7. The method of claim 5, wherein the receiving, by the receiving end, the indication information sent by the network device, comprises:

receiving, by the receiving end, a radio resource control (RRC) signaling sent by the network device, wherein the radio resource control signaling comprises the indication information.

8. A device for transmitting data, comprising:

a memory, a processor, a transceiver and a computer program stored on the memory and operable on the processor, wherein the processor, when running the computer program, is configured to:

start a timer of a first delivery mode when determining that delivered data and data to be delivered are out of order, wherein the first delivery mode is used to indicate that the device directly delivers data to an upper layer upon receipt of the data;

control the transceiver to deliver the data to be delivered to the upper layer using the first delivery mode in a case wherein the timer of the first delivery mode has not expired; and set a window lower bound identification of a reordering window to a count value corresponding to a service data unit (SDU) that is expected to be delivered next time when the timer of the first delivery mode is in an expired state;

wherein in starting the timer of the first delivery mode, the processor is configured to:

start the timer of the first delivery mode when the count value corresponding to the SDU that is expected to be delivered next time is not equal to a next count value of the count value corresponding to a last delivered SDU.

9. The device of claim 8, wherein the processor is further configured to:

stop the timer of the first delivery mode, upon determining that the delivered data and the data to be delivered are in order under a condition that the timer of the first delivery mode is running.

10. The device of claim 8, wherein the processor is further configured to:

determine whether the delivered data and the data to be delivered are in order according to window information of the reordering window and information of the delivered data.

11. The device of claim 8, wherein the device is a terminal device or a network device.

12. The device of claim 11, wherein the device is a terminal device, and the processor is further configured to:

control the transceiver to receive indication information sent by a network device, wherein the indication information is used to indicate that the device delivers data to the upper layer using the first delivery mode or a second delivery mode, wherein the second delivery mode is used to indicate that the device delivers data to the upper layer in order.

13. The device of claim 12, wherein the indication information is configured to indicate that a packet data convergence protocol (PDCP) layer of the device delivers data to the upper layer using the first delivery mode or the second delivery mode.

14. The device of claim 12, wherein the indication information is configured to indicate that a radio link control (RLC) layer of the device delivers data to the upper layer using the first delivery mode or the second delivery mode.

15. The device of claim 12, wherein in receiving the indication information, the processor is configured to:

control the transceiver to receive a radio resource control (RRC) signaling sent by the network device, wherein the radio resource control signaling comprises the indication information.

16. A device for transmitting data, comprising:

a memory, a processor, and a computer program stored on the memory and operable on the processor, wherein the processor, when running the computer program, is configured to:

set a duration of a timer of a second delivery mode to zero; and deliver data to be delivered to an upper layer using a first delivery mode;

wherein the first delivery mode is used to indicate that the device directly delivers data to the upper layer upon receipt of the data, and the second delivery mode is used to indicate that the device delivers data to the upper layer in order;

wherein the processor is further configured to:

start a timer of the first delivery mode when determining that delivered data and data to be delivered are out of order;

control a transceiver of the device to deliver the data to be delivered to the upper layer using the first delivery mode in a case wherein the timer of the first delivery mode has not expired; and set a window lower bound identification of a reordering window to a count value corresponding to a service data unit (SDU) that is expected to be delivered next time when the timer of the first delivery mode is in an expired state;

wherein in starting the timer of the first delivery mode, the processor is configured to:

start the timer of the first delivery mode when the count value corresponding to the SDU that is expected to be delivered next time is not equal to a next count value of the count value corresponding to a last delivered SDU.

\* \* \* \* \*